United States Patent
Vadgama et al.

(10) Patent No.: US 7,787,412 B2
(45) Date of Patent: Aug. 31, 2010

(54) UPLINK SCHEDULING

(75) Inventors: Sunil Keshvaji Vadgama, Middlesex (GB); Rahim Tafazolli, Cheam (GB)

(73) Assignee: Fujistu Limited, Kawasaki (JP)

(*) Notice: Subject to any disclaimer, the term of this patent is extended or adjusted under 35 U.S.C. 154(b) by 891 days.

(21) Appl. No.: 11/214,900

(22) Filed: Aug. 31, 2005

(65) Prior Publication Data

US 2006/0056346 A1 Mar. 16, 2006

(30) Foreign Application Priority Data

Sep. 13, 2004 (GB) ................. 0420354.3

(51) Int. Cl.
- H04B 7/216 (2006.01)
- H04B 7/212 (2006.01)
- H04J 3/24 (2006.01)
- H04W 36/00 (2009.01)
- H04W 72/00 (2009.01)

(52) U.S. Cl. .............. 370/320; 370/322; 370/355; 370/335; 370/342; 370/349; 455/436; 455/439; 455/450; 455/453

(58) Field of Classification Search ........... 455/515, 455/500, 67.11, 67.13, 67.7, 436–439, 442–444, 455/522; 370/320, 322, 355, 335, 342, 349

See application file for complete search history.

(56) References Cited

U.S. PATENT DOCUMENTS

| | | | |
|---|---|---|---|
| 5,345,598 A * | 9/1994 | Dent | ........................... 455/522 |
| 2002/0093953 A1 | 7/2002 | Naim et al. | |
| 2004/0102202 A1 | 5/2004 | Kumaran et al. | |
| 2004/0219919 A1 * | 11/2004 | Whinnett et al. | ............. 455/442 |
| 2005/0249148 A1 * | 11/2005 | Nakamata et al. | ........... 370/328 |

FOREIGN PATENT DOCUMENTS

EP 0 565 503 A3 1/1993

OTHER PUBLICATIONS

Fujitsu: "Virtually Centralizes Uplink Packet Scheduling for Enhanced ULDCH"; dated Oct. 6, 2003; pp. 1-6; document No. XP-002359072.
Motorola: "Rate Control Scheduler for Enhanced Uplink"; dated Aug. 16, 2004; pp. 107; document No. XP00235.
Siemens: "Considerations on Enhanced Uplink Scheduling Options"; dated Aug. 16, 2004; pp. 1-4; document No. XP002359074.
Fujitsu: "Signalling Framework for Enhanced Uplink Scheduling "; dated Aug. 16, 2004; pp. 1-3; document No. XP002359075.
Fujitsu: "Some Issues with Utonomous Ramping: Offset Selection, Fairness"; dated Nov. 15, 2004; pp. 1-5; document No. XP002359076.
European Search Report dated Dec. 15, 2005.

* cited by examiner

*Primary Examiner*—Vincent P Harper
*Assistant Examiner*—Ariel Balaoing
(74) *Attorney, Agent, or Firm*—Hanify & King, P.C.

(57) ABSTRACT

A method of obtaining a relative indicator for use in scheduling uplink transmissions from a plurality of source user equipments to a base station is disclosed. The relative indicator indicates the status of a user equipment in comparison to the status of the other user equipments, therefore allowing a user equipment to make more efficient scheduling decisions. The method comprises the steps of determining, for each user equipment, a first indicator which is indicative of a status of that user equipment, determining at least one second indicator from the first indicators obtained for all user equipments and broadcasting the or each second indicator to all user equipments. In this way, a significant reduction the downlink signaling load can be achieved.

49 Claims, 5 Drawing Sheets

UPLINK SCHEDULING

The present invention relates to techniques for obtaining a relative indicator which is suitable for use in the scheduling of uplink transmissions in wireless communications systems. The present invention is particularly, but not exclusively, applicable to code division multiple access (CDMA) communications systems such as 3G communication systems.

FIG. 1 shows parts of a wireless communications system, in which a plurality of source user equipments UE1, UE2, UE3 are in communication with a plurality of destination user equipments UE4, UE5, UE6 via a base station BS. Source UEs UE1, UE2, UE3 transmit data packets in an uplink to the base station BS. Base station BS receives the data packets from the source UEs and buffers these data packets for onward transmission in a downlink to the destination UEs. One or more of the destination UEs may be in another cell and/or one or more of the destination UEs could even be a terminal connected by wire or optical fibre to the network.

Multiple access modulation techniques are employed in any wireless communication system to allow multiple users to transmit data. Well known examples of such modulation techniques are time division multiple access (TDMA), frequency division multiple access (FDMA) and code division multiple access (CDMA). CDMA is a modulation technique whereby all transmissions occur in the same frequency band and each transmission is assigned a unique channelisation code. The 3G standards, such as cdma2000 or W-CDMA, presently being developed for evolving wireless communication systems are essentially based on a CDMA modulation scheme. W-CDMA is a wideband spread spectrum 3G interface which facilitates the transmission of a signal in a bandwidth which is greater than the frequency content of the original data. These networks allow the transmission of high speed packets on code modulated, time slotted channels. A detailed technical explanation is given in "WCDMA for UMTS, radio access for Third Generation Mobile Communications", edited by H. Holma and A. Toskala, published by John Wiley & Sons Ltd, 2000. ISBN: 0471720518.

In the communication system shown in FIG. 1, each wireless channel is allocated a separate channelisation code in order to distinguish that channel from the other channels. In any wireless communications system it is necessary to provide some mechanism for determining when and how each of the source UEs transmits its data in the uplink to the base station. In the simplest case, each source UE transmits whenever it has data to send. This technique may work well when there are low offered loads on the uplink. However, if too many UEs try to transmit data at the same time, the interference levels may become unacceptable, resulting in poor quality of service.

Various techniques are known for scheduling of uplink transmissions. The aim of these scheduling techniques is to manage the way in which the UEs transmit to the base station in order to optimise the allocation of resources and to meet certain criteria relating to interference levels, fairness or throughput. The issue of resource allocation is a key factor in the design of wireless systems and is even more critical in 3G systems where increasing demands for the transfer of both voice and non-voice data must be handled efficiently. Scheduling data transmissions is crucial if the transfer of data over the wireless spectrum is to be efficiently controlled.

In one scheduling technique, known as time scheduling, a single UE is given the full uplink resources for a given period of time. Some mechanism is implemented for determining which UE has the channel resources at any one time. For example, each UE may take it in turns to transmit its data, or else the UE which is given the channel resources may be selected by taking into account the channel quality.

In time scheduling, only one UE transmits at any one time, and so each UE can transmit within its time window at a high data rate, without causing interference to other UEs. However, time scheduling may be inefficient in terms of throughput in the uplink due to the delays involved in informing each UE when it can transmit. Other disadvantages of time scheduling include loss of interference diversity (which increases the interference caused to adjacent cells), less accurate power control, due to less frequent power control signals, and wasted uplink capacity when a UE has little to transmit.

In another scheduling technique, known as rate scheduling, each UE decides on the rate, and thus the power, at which it transmits data based on information which is signalled to it by the network. For example, in 3G communications systems (W-CDMA), each UE may decide its rate based, for example, on information from the Transport Format Combination Set (TFCS) signalled to it by the radio network controller (RNC) and/or in reliance upon its transmitter power assignment. This rate is usually less than the UE's maximum rate, determined by the UEs power assignment, and is set to ensure that interference levels remain within acceptable parameters.

Generally, a UE's maximum rate is determined, for example, by the UE's transmission capability and/or the receiving capability of the Base Station. It may be further constrained by the UE's transmit power limit or assigned limit by the base station or the uplink traffic load.

An advantage of rate scheduling is that, since many UEs are transmitting, interference diversity is maintained, which reduces interference to neighbouring cells. Rate scheduling also provides the advantage that call admission and power control mechanisms are more accurate than for time scheduling. However, rate scheduling suffers from the disadvantage that the UEs will each interfere with each other, since many UEs may be transmitting simultaneously.

In the downlink, it is the base station which is responsible for scheduling the packets which are to be transmitted to the various destination UEs. The scheduling functions for the downlink are therefore centralised in the base station. The base station is able to make the appropriate scheduling decisions because it is the sole starting point for transmission to the destination UEs. For example, the base station is aware of the amount of data in the buffers allocated for each destination UE, and thus can make scheduling decisions based on this knowledge. However, in the uplink the scheduling functions are decentralised, that is, they are distributed amongst the source UEs. For example, the source UEs are not aware of the amount of data in the buffers of the other source UEs or of the transmission delay experienced by other source UEs. As a consequence, it is not possible for the source UEs to make scheduling decisions based on parameters which are indicative of the status or performance of other source UEs.

For example, in a situation where only one UE has a significant amount of data to transmit (i.e. the other UEs have little data, or there are few active UEs actually present), the UE with a large amount of data still cannot choose to transmit at a high data rate, because it is not aware of the status of the other UEs. In this situation, the UE with a large amount of data will experience unnecessary delays, because it could in fact have transmitted at a higher data rate. On the other hand when the base station is dealing with many UEs at any one time, a UE which is not aware of the situation might choose a very high data rate. This may lead to a high level of interference for the entire uplink, and thus a reduction in the quality of service for all UEs.

Previously it has been proposed to schedule uplink transmissions from a plurality of source user equipments to a base station (commonly known in the context of 3G communications systems as Node-B) in dependence upon a relative indicator or comparative metric (CM) which is indicative of the status of a user equipment relative to the status of other user equipments in a defined group of user equipments. Various parameters may be measured which provide information about the "status" of a user equipment. One of the most commonly measured status parameters is how much data each UE has in its buffer. Other status parameters which may usefully be considered for scheduling procedures include, for example, transmission delay experienced by the UE and transmit power available to the UE.

For example, in a previously proposed method, uplink transmissions have been scheduled in dependence upon a relative indicator which indicates how full a user equipment's buffer occupancy is in comparison to the average buffer occupancy value for all active user equipments, or in comparison to the lowest buffer occupancy value of all active UEs (the minimum buffer occupancy). In order to carry out this method, each source UE periodically determines a value representing its buffer occupancy status and transmits this information to the base station. Thus, the base station is aware of the buffer occupancy status of each source UE served in the uplink and can calculate a relative indictor for each source UE. This relative indicator is transmitted to the appropriate UE and is then used by that UE to schedule its uplink transmissions. Thus, an advantage of using relative indicators to perform scheduling operations is that each user equipment is given knowledge about the status of other UEs and can therefore make more accurate scheduling decisions in order that better use may be made of the channel resources.

A problem with this method is that each relative indicator determined in the Node-B is UE specific, and must be transmitted, over a designated channel, in the downlink to the UE so that the scheduling function may be performed. The method therefore requires significant signalling in the downlink. Downlink capacity is therefore taken up with the transmissions required to run the scheduling operations. These transmissions will also contribute to the overall noise and interference levels in the downlink, thus reducing the total downlink capacity available to other downlink data traffic. The DL signalling load is a function of the number of UEs active (i.e. transmitting data) in the cell.

According to one aspect of the present invention there is provided a method of obtaining a relative indicator for use in scheduling uplink transmissions from a plurality of source user equipments to a base station, the relative indicator indicating the status of a user equipment relative to the status of the other user equipments, the method comprising the steps of:
  i) determining, for each user equipment, a first indicator which is indicative of a status of that user equipment at a given time;
  ii) determining at least one second indicator from the first indicators obtained in step i) for all user equipments;
  iii) broadcasting the or each second indicator obtained in step ii) to all user equipments; and
  iv) determining, for a given user equipment, a relative indicator from the first indicator obtained for that user equipment and one of the second indicators determined either in step ii) or previously.

The first indicator obtained in step i) may be, for example, an indication of the buffer occupancy of the user equipment, the transmission delay experienced by the UE or the transmit power available to the UE. The second indicator, which is determined from consideration of all of the first indicators obtained in step i), may represent, for example, the average of the first indicators or the minimum/maximum of the first indicators. The relative indicator may be the difference between the first indicator obtained for a given user equipment and a second indicator, or it may be the ratio of: i) the first indicator to the second indicator; or ii) the second indicator to first indicator.

Embodiments of the present invention provide the advantage that since the second indicator is commonly required to determine the relative indicator for all UEs, it may be broadcast over a common/shared channel in order that each UE, together with the first indicator specific to that UE, can compute its own relative indicator. Thus, the capacity required by the DL is significantly reduced in comparison to the previously proposed method in which a relative indicator specific to each user equipment was determined in the base station and then transmitted in a dedicated DL channel to the appropriate UE. A significant reduction the DL signalling load can therefore be advantageously achieved in accordance with embodiments of the present invention in comparison to schemes which employ dedicated signalling of unique scheduling parameters to each UE.

In one embodiment of the present invention, the relative indicator for a given user equipment is determined using a second indicator which has been determined from the first indicators obtained for all user equipments at the same instant in time as the first indicator was obtained.

Alternatively, in another embodiment, the relative indicator for a given user equipment is determined from a second indicator which has been determined from the first indicators obtained for all user equipments at a previous instant in time to the instant in time at which the first indicator was obtained. Thus, an advantage of this embodiment is that the effect of latency of the relative indicator can be reduced since the UE can use the latest first indicator information with a previously received second indicator to determine the relative indicator. Thus, in the case where the status indicators relate to buffer occupancy, the average buffer occupancy by its very nature would change much more slowly than the UE's own buffer occupancy.

The term broadcast means that data can be transmitted from a single source to multiple destinations (i.e. point to multi-point).

In order for the base station to determine the second indicator required in the determination of the relative indicator for all UEs, it must have available a measure of the status of all UEs. In order to achieve this, in one embodiment, the UE determines a measure of its status and transmits this, or an indication of this, to the base station. Thus, for example, each UE may periodically send buffer occupancy information the base station. Using the status information obtained from all UEs, the base station is able to determine a second indicator, such as the average or the minimum of the first indicators. The second indicator is then broadcast, in accordance with embodiments of the present invention, to all of the UEs.

Preferred embodiments of the first aspect of the present invention further comprise the step of scheduling uplink transmissions from the source user equipments to the base station in dependence on the relative indicator obtained by each UE.

In accordance with embodiments of the present invention it is envisaged that either a single relative indicator or a plurality of relative indicators may be determined. By finding a plurality of relative indicators, each user equipment may have a better idea of its overall status in comparison to other user equipments. Where a single relative indicator is determined for each user equipment, this may be one of an indication of how full (or empty) the user equipment's buffer is in comparison to the average, and an indication of how full the user equipment's buffer is in comparison to the minimum. Otherwise, both an indication of how full the user equipment's buffer is in comparison to the average, and an indication of how full a user equipment's buffer is in comparison to the minimum may be determined. Alternatively, using historic information about the buffer occupancy values, it is possible to calculate the mean transmission delay experienced by each UE so that an relative indication of the mean transmission delay experienced by a UE compared to the average or minimum mean transmission delays for all UEs can be determined. One or both of these relative indicators could be used, in addition to one or both of the buffer occupancy relative indicators, in a scheduling algorithm in accordance with embodiments of the present invention.

In addition to relative indicators, it is advantageous for embodiments of the present invention to schedule uplink transmissions in dependence upon an indication of the noise rise experienced in the UL or on an indication of the level of unallocated noise rise in the UL. Noise Rise in CDMA systems is generally defined as a ratio of total received wide power at the base station due to transmissions from all UEs to the noise power of the base station receiver. This ratio provides an indication of the traffic loading of the cell in uplink and is more fully discussed in the reference given above entitled "WCDMA for UMTS, radio access for Third Generation Mobile Communications". Un-used, or un-allocated, noise rise is thus the difference between the maximum value of this ratio at which the uplink receiver would operate satisfactorily and the actual ratio experienced at the base station receiver.

In order for the uplink scheduling to be effective, the relative indicators are preferably updated on a regular basis. However, it may in some circumstances be undesirable for the user equipments to be transmitting indications of their status on a regular basis. For example, if many user equipments are present, or a large amount of data needs to be transmitted in the uplink, the extra transmissions involved in the reporting process may increase the amount of interference or congestion to an unacceptable level. Thus, in another embodiment, a user equipment sends to the base station an indication of the total amount of data to be sent, and the base station determines the amount of data in the user equipment's data buffer based on the indication of the total amount of data, and the amount of data already received by the base station from that user equipment. This can reduce the number of transmissions involved in the reporting process in the uplink.

Each user equipment may determine a rate and/or time at which it transmits data to the base station based on the or each relative indicator for that user equipment. For example, a user equipment which receives an relative indicator indicating that it has a relatively full buffer may transmit data to the base station at a higher rate than would otherwise be the case (all other things being equal). On the other hand, a user equipment which receives a relative indicator indicating that it has a relatively empty buffer may transmit data to the base station at a lower rate than would otherwise be the case. In this way, the amount of data in the data buffers of the user equipments can brought into approximate equilibrium, so that all of the data buffers have approximately the same occupancy. This increases the fairness of the system, and may also improve the overall throughput.

The user equipment may determine the time and/or rate at which it transmits data based additionally on a measurement of radio channel conditions, such as signal to noise and interference ratio (SNIR) and/or the radio link path loss. This can allow the user equipment to take advantage of good radio conditions, where they exist, by transmitting at a higher rate than would otherwise be the case. On the other hand, a user equipment with poor radio conditions may decide not to increase its transmission rate when it might otherwise have done so, since it would see little benefit from doing so. The user equipment may determine the measure of radio channel conditions itself, or it may receive it from the base station or the network or elsewhere.

The user equipment may determine the time and/or rate of packet transmission based additionally on the actual amount of data in its data buffer, rather than just the relative indicators. This can allow the scheduling to be based partially on the absolute amount of data in its buffer, which may lead to better decisions. For example, the amount of data in the buffer may be compared to a threshold, such as a minimum buffer threshold.

The user equipment may determine the time and/or rate of packet transmission based additionally on the type of service. In general, user equipments transmitting services with a higher priority or which are more time critical may be allowed to transmit more often or at a greater rate than services with a lower priority or which are less time critical. For example, video services may be given greater priority than web pages.

Each user equipment may be assigned a minimum buffer threshold. In general, if the amount of data in the data buffer is below the threshold, then the user equipment will not transmit. However, this condition may be overridden where the user equipment receives a relative indicator indicating that it has more data to transmit than other user equipments. Therefore a user equipment which receives a relative indicator indicating that it has more data to transmit than other user equipments may transmit data to the base station even if the amount of data in its data buffer is below a minimum buffer threshold.

The uplink transmissions may be scheduled using rate scheduling, or they may be scheduled using hybrid rate-time scheduling. Hybrid rate-time scheduling may be preferred in some circumstances because of the greater flexibility which it offers. For example, it can allow a poorly performing user equipment to recover quickly by allowing it to transmit on its own or with few other user equipments for a certain period of time. However, in other circumstances hybrid rate-time scheduling may not be appropriate; for example the delays which may result in some channels may not be tolerated by the power control mechanism. Therefore the method may also include a step of switching from one to the other of rate scheduling and hybrid rate-time scheduling. The decision to switch from one to the other may be based on some measure of a system parameter, such as a measure of whether power control is being performed within acceptable parameters, or whether interference diversity is within acceptable levels.

In one example, the rate of uplink transmission is varied by adjusting the modulation and coding scheme level. In other example the rate of uplink transmission is varied by adjusting the intervals at which the uplink transmissions take place. A user equipment may also increase its rate of uplink transmissions by adapting its spreading code, or by occupying two or more channels. Any other appropriate technique for varying the rate of uplink transmission could be used as well or instead of these techniques.

According to a second aspect of the present invention there is provided a user equipment comprising:
   i) means for transmitting to a base station a first indicator which is indicative of a status of the user equipment at a given time;

ii) means for receiving, from a base station via a broadcast channel, at least one second indicator, wherein the or each second indicator has been determined from either a) the first indicator and another first indicator which is indicative of a status of at least one other user equipment at the same time, or b) from a first indicator which is indicative of the status of the user equipment at a previous time and at a first indicator which is indicative of a status of at least one other user equipment at the previous time; and iii) means to determine a relative indicator from the first indicator and one of the second indicators.

Preferably, the user equipment comprises a means to determine the first indicator which is indicative of a status of the user equipment. The user equipment preferably also comprises a means to schedule uplink transmissions in dependence on the relative indicator.

The scheduling means may determine a rate and/or time at which data is to be transmitted to the base station based on the relative indicator. The scheduling means may be arranged such that data is transmitted to the base station at a higher rate than would otherwise be the case when the user equipment receives a relative indicator indicating that it has a relatively full buffer. The scheduling means may also or alternatively be arranged such that data is transmitted to the base station at a lower rate than would otherwise be the case when the user equipment receives a relative indicator indicating that it has a relatively empty buffer. The scheduling means may be arranged to determine the time and/or rate at which data is transmitted based additionally on a measurement of radio channel conditions. The scheduling means may be arranged to determine the time and/or rate of data transmission based additionally on the type of service. The scheduling means may be arranged to determine the time and/or rate of data transmission based additionally on the or a amount of data which is determined to be in its data buffer.

The data buffer in the user equipment may be assigned a minimum buffer threshold. In general, if the amount of data in the data buffer is below the threshold, then the user equipment will not transmit. However, this condition may be overridden where the user equipment receives a relative indicator indicating that it has a relatively large amount of data to transmit. The scheduling means may be arranged such that data is transmitted even when the amount of data in the data buffer is below a minimum buffer threshold, when the user equipment receives a relative indicator indicating that it has more data to transmit than other user equipments.

According to a third aspect of the present invention there is provided a base station comprising:

i) means to receive a first indicator, which is indicative of the status of a given user equipment, from each of a plurality of source user equipments;

ii) means to determine a second indicator from the first indicators obtained for all user equipments; and iii) means to broadcast the second indicator to all source user equipments via a broadcast channel.

The means to determine a second indicator may determine an indication of the average and/or minimum of the first indicators received from all of the user equipments. The first indicators received from the user equipments may be, for example, indicative of how full a data buffer associated with each user equipment is. Using historical information about the buffer occupancy values obtained from each UE, the base station may also comprise a means to determine a indication of the mean transmission delay for each user equipment. This may be used by the base station to determine the average mean transmission delay for all user equipments and/or the minimum mean transmission delay for all user equipments. The base station may advantageously broadcast the average mean transmission delay and/or the minimum mean transmission delay to all of the user equipments.

Preferably, the base station may also determine an indication of the noise rise (otherwise known as the rise over thermal (RoT)) experienced by the base station receiver. From this, the base station may then determine ratio of the rise over thermal to the noise rise target for the uplink (RoT/NRT) which is advantageously broadcast to all user equipments and used, in conjunction with one or more relative indicators, in making scheduling decisions.

The base station may periodically perform "mirror" calculations in order to determine the relative indicator associated with a UE for itself. The result of a mirror calculation can be advantageously used by the base station to check the transmissions from a user equipment, in particular, to check that a given UE does not significantly exceed the allocated transmission rate, the transmission time or the transmission power. In this way, it is possible to identify, and thus correct, the signalling behaviour of so-called "rogue" UEs. The mirror calculations may be performed as often, or less often, as status indicators are received from a UE.

According to a fourth aspect of the present invention there is provided a user equipment comprising:

i) a transmitter which transmits a first indicator which is indicative of a status of the user equipment;

ii) a receiver which receives from a base station via a broadcast channel, at least one second indicator wherein the or each second indicator has been determined from either a) the first indicator and another first indicator which is indicative of a status of at least one other user equipment at the same time, or b) from a first indicator which is indicative of the status of the user equipment at a previous time and at a first indicator which is indicative of a status of at least one other user equipment at the previous time; and iii) a unit which determines a relative indicator from the first indicator and the second indicator.

Preferably the user equipment further comprises a scheduler which schedules uplink transmission in dependence on the relative indicator.

According to a fifth aspect of the present invention there is provided a base station comprising:

i) a receiver which receives a first indicator from each of a plurality of source user equipments which is indicative of the status of a given user equipment;

ii) a unit which determines a second indicator from the first indicators obtained for all user equipments;

iii) a transmitter which broadcasts the second indicator to all source user equipments via a broadcast channel.

It is envisaged that the user equipments may modify the second indicator by means of an "offset". This offset could be, for example, (a) proportional to the ratio of RoT/NRT or (RoT/NRT)−1; (b) it could be fixed (e.g. a percentage of total system capacity); or (c) it could be proportional to the traffic load in cell (e.g. RoT). The use of an offset, for example, which is related to the ratio RoT/NRT can be particularly useful since it allows the cell load to be controlled. For example, the value of ((RoT/NRT)−1) will be negative when the cell is under-loaded. Thus, when this value is negative, the offset is also negative, giving an artificial bias to "average" and "minimum" indicators such that more traffic is scheduled. Similarly, the value of ((RoT/NRT)−1) will be positive when the cell is overloaded and thus a positive offset would artificially raise the minimum and average indicators thus reducing the total traffic scheduled on the uplink. The use of an offset in this way can advantageously help control the cell load.

It should be appreciated that the term "user equipment" encompasses any device which is operable for use in a wireless communication system. Furthermore, although the present invention has been described primarily with reference to implementations which rely on 3G technology, it is envisaged that embodiments of the present invention may be usefully applied in any wireless communication systems.

Features of one aspect of the invention may be applied to any other aspect. Any of the method features may be applied to any of the apparatus aspects and vice versa.

In any of the above aspects, the various features may be implemented in hardware, or as software modules running on one or more processors.

The invention also provides computer programs and computer program products for carrying out any of the methods described herein, and computer readable media having stored thereon programs for carrying out any of the methods described herein. A computer program embodying the invention may be stored on a computer-readable medium, or it could, for example, be in the form of a signal such as a downloadable data signal provided from an Internet web site, or it could be in any other form.

For a better understanding of the present invention, and to show how the same may be carried into effect, reference will now be made, by way of example, to the accompanying drawings in which.

Figure 1:
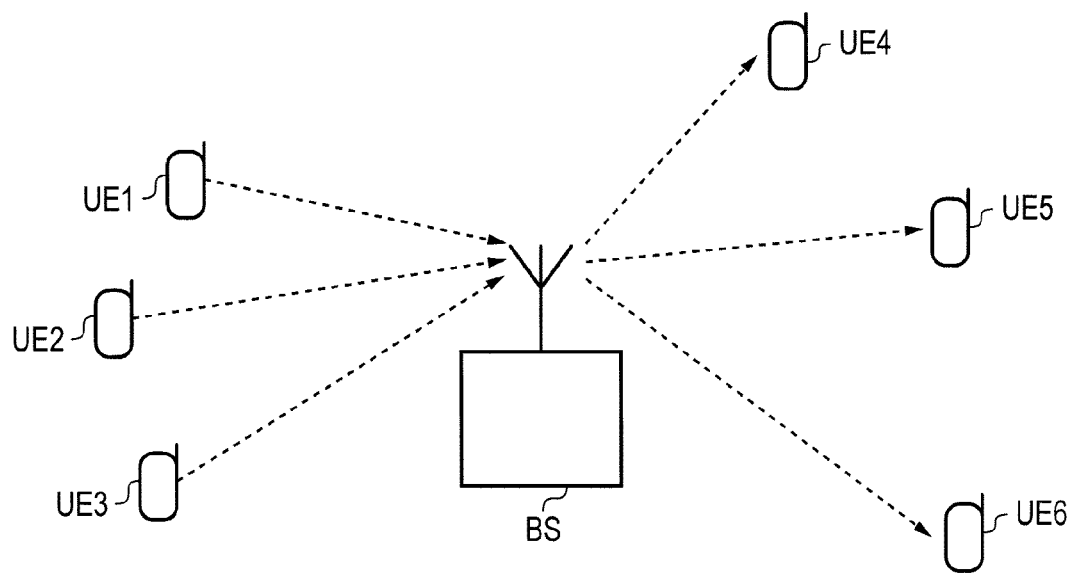
FIG. 1 shows parts of a wireless communications system.

In the embodiments discussed below it is assumed that, as shown in FIG. 1, the base station (node-B) serves a number of source UEs and destination UEs, and each UE is assigned a packet data buffer. One or more of the destination UEs may be in another cell and/or one or more of the destination UEs could even be a terminal connected by wire or optical fibre to the network.

Each of the source UEs is grouped into a particular service group depending on the delay tolerance of the data that it is transmitting. The delay tolerance is a measure of the maximum acceptable time for a data packet to reach its destination. For example, video services may have a low delay tolerance of, say, 100 mS, while web services may have a relatively high delay tolerance.

In a first embodiment, the status metric considered by the scheduling algorithm is related to buffer occupancy and the relative indicators which are sought are distance from average and distance from minimum. During each uplink scheduling event, each source UE determines the amount of packet data existing in its buffer and waiting for transmission. Assuming the n-th source UE belongs to the j-th service group with the same delay tolerance, each source UE divides this value by the maximum length of its data buffer to obtain a ratio of buffer occupancy, as follows $$\text{Buffer\_Norm\_L}_n(m) = L_n(mL_{max,j}, n=1\ldots N_j \quad (1)$$

where $L_n(m)$ is the amount of data in the buffer, the index m represents the current TTI or uplink scheduling event, N is the total number of source UEs, and $L_{max,j}$ is the maximum packet data buffer length which depends on the service group j. Each UE multiplies this value Buffer_Norm_$L_n$(m) by 100 and takes the integer part to obtain a value referred to herein as the buffer occupancy value. Each UE then sends this value to the base station. As an alternative the real numeric value between zero and one could be sent.

The base station receives the buffer occupancy value from each UE served in the uplink. The base station is also aware of the maximum data buffer assigned to each service, and thus the base station can determine the amount of packet data is currently waiting in each source UE's buffer for transmission. The base station groups the source UEs according to their service class. It then determines the minimum normalised buffer occupancy value and broadcasts this value, over a common channel, to all of the UEs in the class. Thus, each UE is able to calculate the distance of its buffer occupancy value from the minimum ratio in its class. This can be found by the following expression:

$$\text{Distance\_min}_n(m) = \text{Buffer\_Norm\_L}_n(m) - \text{Buffer\_Norm\_L}_{min,j}(m), n=1\ldots N_j \quad (2)$$

where Nj represents the number of present UEs in class j.

To increase the homogeneous behaviour of the metric, if desired, the distance from minimum value may be subject to a secondary normalised and mathematical mapping, by dividing the distance by the sum of all the distances.

Then the base station determines the average normalised buffer occupancy ratio in a class of UEs as follows:

$$\text{Avg\_Ratio}_j(m) = \frac{1}{N_j} \sum_{i=1}^{N_j} \text{Buffer\_Norm\_L}_i(m) \quad (3)$$

This value is broadcast, over a common channel, to all of the UEs in the class. Thus, each UE is able to calculate the distance of its buffer occupancy value from the average ratio in its class. This can be found by the following expression:

$$\text{Distance\_Avg}_n(m) = \text{Buffer\_Norm\_L}_n(m) - \text{Avg\_Ratio}_j(m), n=1\ldots N_j \quad (4)$$

If desired, this metric may also be subject to a secondary normalised and mathematical mapping, by dividing the average received ratio by the sum of all of the received ratios.

The distance from minimum value and the distance from average values may be converted to two information bytes, one indicating how full its buffer is in comparison to the least full buffer (distance from minimum), and one indication how full its buffer is in comparison to the average (distance from average), to be used in the current uplink scheduling event.

The UE combines these two relative values with its knowledge about the exact amount of packet data in its buffer and with its own knowledge on radio channel condition in terms of SINR (signal to noise and interference ratio) and/or transmission path loss to produce a final metric, as follows:

$$\text{Final\_Metric}_k(m) = COMBI(\text{Distance\_Avg}_k(m), \text{Distance\_min}_k(m), Ch_k(m)) \quad (5)$$

where $Ch_k(m)$ is the knowledge about the quality of the channel in the uplink between the kth source UE and the base station, and COMBI is a function that combines this metric with the distance from average and the distance from minimum.

The UE uses its final metric to determine the rate and/or times at which it transmits its data packets. In general, UEs with a high final metric, indicating a higher buffer occupancy in comparison to other UEs, transmit at a higher rate. In this way the various UEs can be brought into a situation where they have similar levels of buffer occupancy. Further details of the scheduling mechanism are given later.

Furthermore, in accordance with this embodiment, the base-station periodically estimates the Rise over Thermal (RoT) for the UL and calculates the ratio RoT/NRT where NRT is the noise rise target. This ratio is also be broadcast to all UEs in the cell and represents the fractional loading of the cell in terms of the target load. It is therefore a particularly useful metric for rate scheduling algorithms and is advantageously used, in conjunction with the relative indicator determined by the UE and preferably also information about the UEs own power status and buffer status, to determine the rate, and if applicable transmission power, for the next scheduling period.

Fast closed loop power control is applied in the uplink and the power is controlled on the basis of uplink DPCCH of individual UEs. Power is offset between DPCCH (dedicated physical control channel) and E-DCH (enhanced dedicated channel) and is defined by the base station either on a per UE basis or on a cell wide basis.

In another embodiment, the base-station, using historic information about the average and minimum buffer occupancy metrics, may estimate a metric which represents the mean transmission delay for a particular user equipment. It can then use this information to determine, for a given class of UEs, a cell wide average delay metric and/or a minimum delay metric. These metrics are then broadcast to all of the UEs in the class and used by each UE to determine its own metric of "distance of the average delay" and/or "distance from the minimum delay".

User Equipment

Figure 2:
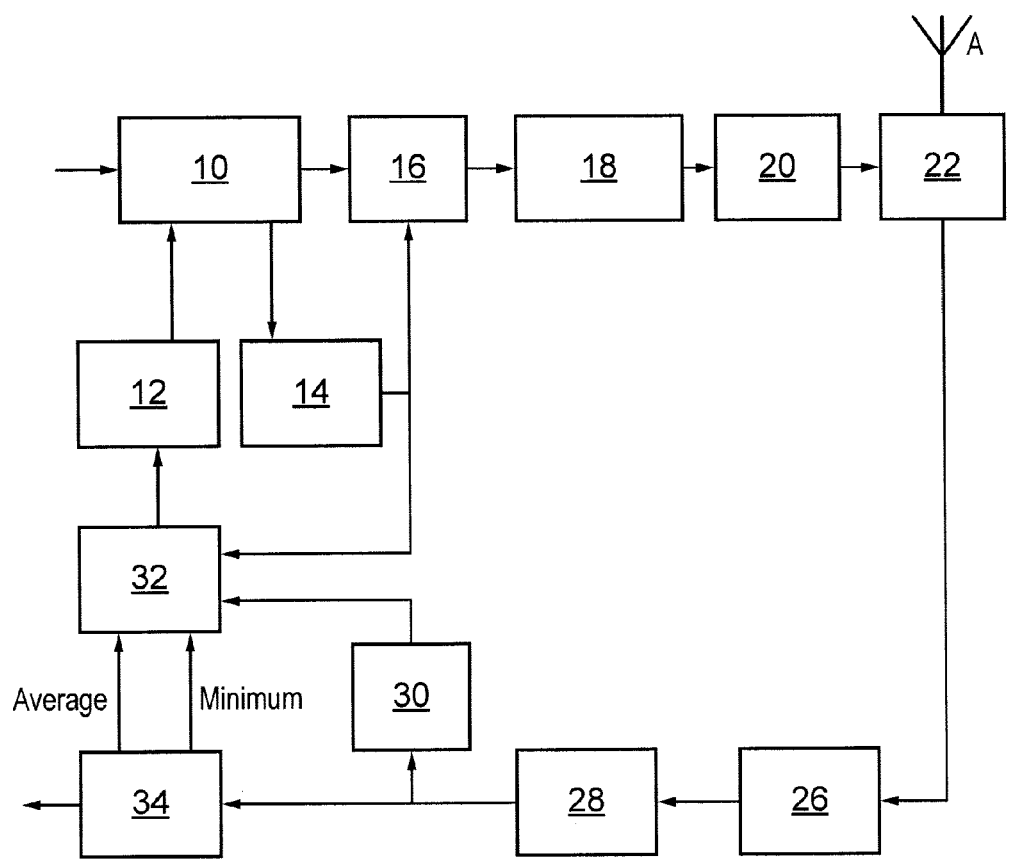
FIG. 2 shows parts of a user equipment in a first embodiment of the invention.

FIG. 2 shows parts of a user equipment in accordance with the first embodiment. Referring to FIG. 2, buffer 10 receives data packets which are to be transmitted and stores them on a first-in-first-out basis. Packets for transmission are output from the buffer 10 under control of scheduler 12.

A signal indicating the number of packets currently stored is output from the buffer 10 to buffer occupancy value calculation unit 14. This unit divides the number of stored packets by the maximum length of the buffer to yield the ratio of stored packets to maximum buffer length, in accordance with equation (1) above. The unit 14 then multiplies this value by 100 and takes the integer part to give a value between 1 and 100, referred to herein as the buffer occupancy value.

The buffer occupancy value calculated by unit 14 is output to multiplexer 16. The multiplexer 16 inserts the value into a control channel which is to be transmitted in the uplink to the base station. Packets output from the buffer 10 are inserted into a data channel. The combined signal is then given a channelisation code by spreader 18, and transmitted to the base station by means of transmitter 20, duplexer 22 and antenna 24.

Signals from the base station are received by receiver 26 via antenna 24 and duplexer 22. Signals intended for that particular user equipment are separated from other signals by despreader 28. The output of despreader 28 is a control channel containing control information for, amongst other things, power control. In this embodiment the control channel also contains the statistical values average buffer occupancy and minimum buffer occupancy broadcast by the base station.

Channel quality indicator 30 estimates the quality of the channel between the user equipment and the base station. Any suitable measure of quality can be produced; for example, a received signal strength (RSS) or power measure, a bit error rate (BER) or a frame error rate (FER) measure, or a signal-to-interference ratio (SIR) or a signal-to-interference-and-noise ratio (SINR) measure could be produced. The measure could be based on a pilot signal broadcast by the base station. For example, the strength of the pilot signal could be taken as a measure of signal quality, or the base station may also broadcast the transmit power ratio of a data channel to the pilot channel, and this ratio could be used in conjunction with the pilot signal strength to obtain a measure of signal quality. Alternatively the measure could be derived from transmission power control (TCP) information (such as a power up/power down instruction) generated in the user equipment for downlink power control purposes. Any of the measures could be based on a history or average of measurements taken over several measurement periods. Two or more measures could be combined, if desired. The output of channel quality indicator 30 is fed to final metric calculation unit 32.

Demultiplexer 34 separates the average and minimum values from the control channel, and passes these values to final metric calculation unit 32. Final metric calculation unit 32 uses the average and minimum values and the buffer occupancy value from unit 14 determine the relative indicators in accordance with equations (4) and (2) above. It can also utilise the channel quality value and the number of stored packets value (output from buffer 10) to yield a final metric, in accordance with equation (5) above. The final metric is output to scheduler 12 for use in scheduling uplink data packet transmissions.

The above reporting processes are repeated at appropriate intervals. For example, the buffer occupancy value may be calculated in the UE and transmitted to the base station every Time Transmission Interval (TTI). Similarly the average values and the minimum values may be calculated in the base station and broadcast over a common channel to the source UEs every TTI. Any of these processes may also be carried out every two or more TTIs where appropriate. For example, when the uplink channel resources are fully utilised, or nearly fully utilised, it may be desirable to further reduce the amount of data which is transmitted for the purposes of scheduling. In this case the reporting processes may only take place every few TTIs. The intervals at which the reporting processes take place may be varied, for example, depending on traffic conditions in the cell or sector.

The intervals may also be varied in dependence on the degree of change observed between the reported vales at subsequent instants in time.

Base Station

Figure 3:
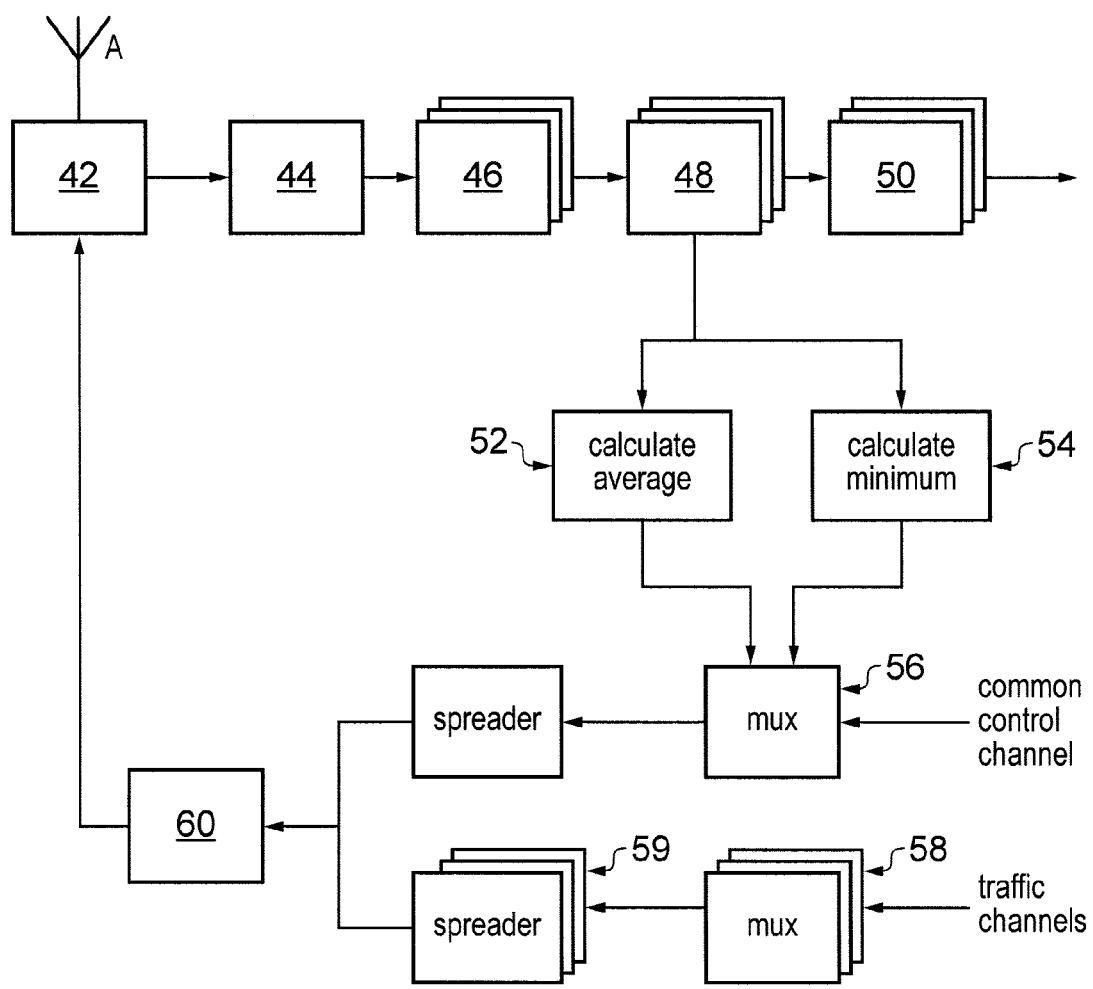
FIG. 3 shows parts of a base station in a first embodiment of the invention.

FIG. 3 shows parts of a base station according to the first embodiment. Referring to FIG. 3, the signals from source user equipments are received by receiver 44 via antenna 40 and duplexer 42. The received signals are passed to a plurality of despreaders 46. Each of the despreaders uses the channelisation code employed in one of the uplink channels from the source UEs to the base station in order to separate the data packets transmitted by that source UE. In this way, the data packets from the various source UEs are separated into separate signals.

The outputs of each one of the despreaders 46 is input to one of a plurality of demultiplexers 48. Each of the demultiplexers separates out the buffer occupancy value from the control channel which is transmitted by the corresponding UE. The data packets for onward transmission to the destination UEs are output to buffers 50, one buffer being provided for each destination UE.

The buffer occupancy values output from the demultiplexers 48 are fed to calculation units 52 and 54. Calculation unit 52 calculates the average buffer occupancy value of the source UEs in a particular class and calculation unit 54 calculates the minimum buffer occupancy of the source UEs in a particular class.

The average and minimum indicators are fed to multiplexer 56. The multiplexer 56 inserts the indicators into a common control channel which is to be transmitted by the base station to all or a group of UEs.

Traffic channels are multiplexed as necessary by unit 58 and then spread using appropriate channalisation codes using the unit 59. The common control channels and data channels are subsequently combined and transmitted using transmitter unit 60, diplexer unit 42 and antenna unit 40.

Figure 4:
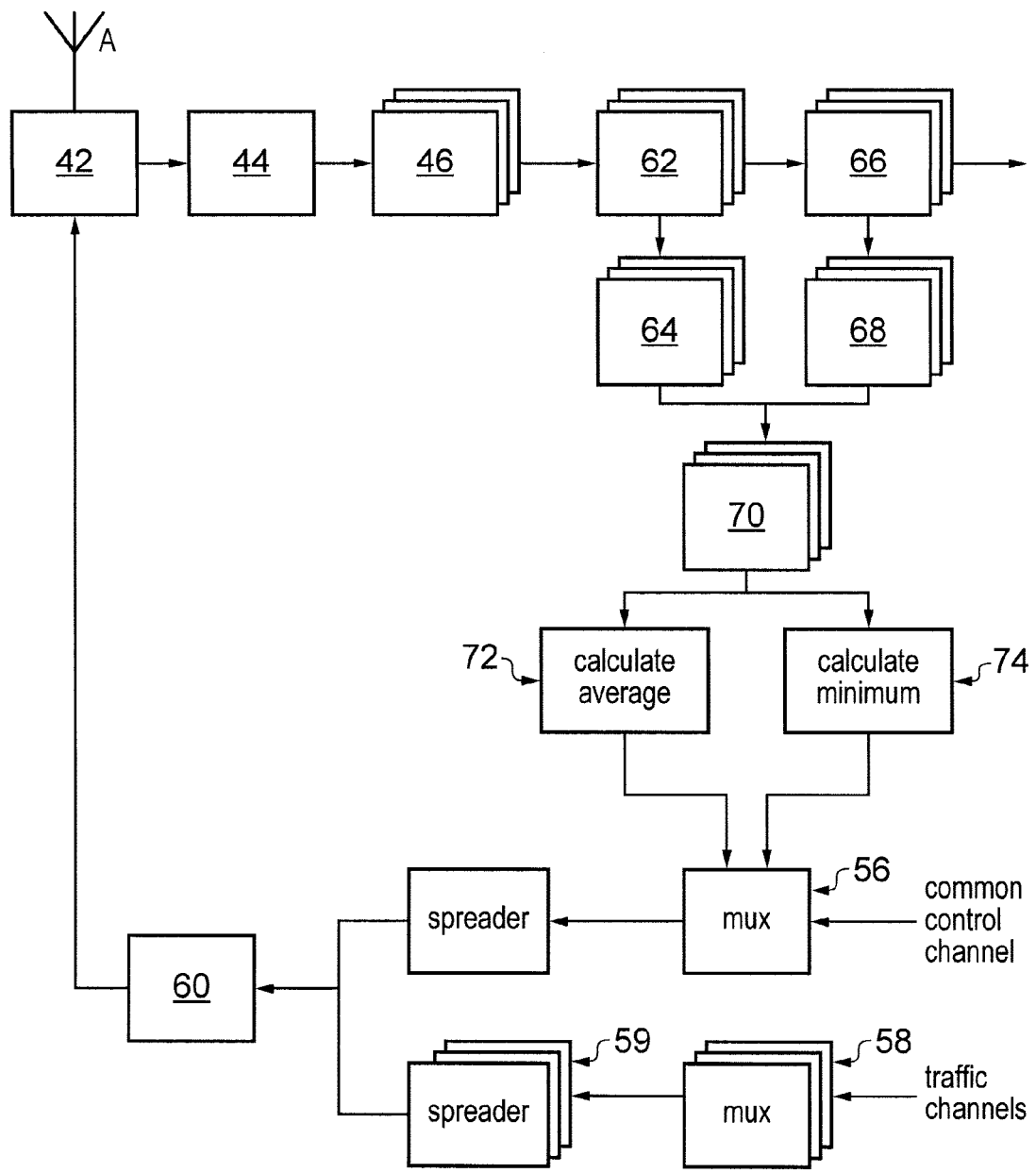
FIG. 4 shows parts of a base station in a second embodiment of the invention.

Referring now to FIG. 4 which shows parts of a base station according to second embodiment of the present invention. In the first embodiment of the invention a buffer occupancy value is sent from each source user equipment to the base station every scheduling event, which may be every TTI, or every few TTIs. However, in some circumstances even reporting every few TTI may be undesirable because of the channel resources which are occupied. Thus, in a second embodiment of the invention, rather than transmit the buffer occupancy values to the base station at every scheduling event, the base station estimates the buffer occupancy values based on information transmitted to it at the beginning of a call, together with its own knowledge of how many packets it has received from a particular UE.

In this embodiment it is assumed that each UE is capable of determining the amount of packet data to be sent at the beginning of packet call. Each UE then sends this first indicator value to the base station. As communication proceeds further, the base station estimates the amount of data remaining in each UE buffer based on these received values, and the number of packets that have been received from each UE. The estimated values thus obtained are then used to determine a second indicator representing the average and minimum values, as in the first embodiment.

In the second embodiment the average and minimum values are broadcast to the UEs for their use in determining a relative indicator as in the first embodiment.

A user equipment in the second embodiment is similar to that shown in FIG. 2 except that, instead of buffer occupancy calculation unit 14, a total number of packets indicator is provided which inserts into the control channel at the start of a packet call the total number of packets in that call.

FIG. 4 shows parts of a base station in the second embodiment. Those parts which are the same as in the base station shown in FIG. 3 are given the same reference numerals and are not described further. Referring to FIG. 4, each of the demultiplexers 62 separates out the total number of packets value which is transmitted by one of the source UEs at the start of a packet call. These values are stored in call length indicators 64. The data packets for onward transmission to the destination UEs are output to buffers 66, one buffer being provided for each destination UE.

For each scheduling event, the number of packets received from each UE in the current packet call is output from the buffers 66 to number of packets received indicators 68. The total number of packets values from unit 64, and the number of packets received values from unit 68, are output to buffer occupancy estimation units 70. Each of these units estimates the buffer occupancy for one of the source UEs. This may be done, for example, by subtracting the number of packets received from the total number of packets for that UE. If desired, account could also be taken of the rate at which the UE buffer is expected to be filled.

The outputs of the buffer occupancy estimation units 70 are estimated buffer occupancy values for each of the source UEs. These values are fed to calculation units 72 and 74 which calculate the average and the minimum values for each class, in a similar way to units 52 and 54 described above with reference to FIG. 3. The outputs of calculation units 72 and 74 are therefore estimated average and minimum values respectively for each source UE.

The thus calculated average and minimum values and the distance from minimum values are fed to multiplexers 56 The multiplexer 56 inserts the indicators into a common control channel which is to be transmitted by the base station to all or a group of UEs.

Traffic channels are multiplexed as necessary by unit 58 and then spread using appropriate channalisation codes using the unit 59. The common control channels and data channels are subsequently combined and transmitted using transmitter unit 60, diplexer unit 42 and antenna unit 40.

If desired, a combination of the first embodiment and the second embodiment could be used. For example, some source UEs could report their buffer occupancies at regular intervals using the first embodiment, while other source UEs could have their buffer occupancies estimated at the base station using the second embodiment. Each UE may switch from one technique to the other, for example, depending on channel conditions.

Scheduling Algorithm

An example of an algorithm which implements an embodiment of the present invention will now be described by way of example.

This algorithm requires a minimum of 2 metrics:
I. CB: A relative indicator based on buffer size of the UE; and
II. CI: Capacity Indicator at Node-B which can be defined as RoT/NRT. NRT is the Noise Rise Target and RoT is the Rise over Thermal noise averaged every TTI.

In accordance with this embodiment of the present invention CI and the second indicator required to calculate CB for all UEs are signalled to all UEs over a cell wide broadcast channel. CB is calculated in accordance with equation 4 above.

(1) Term Definitions:

QbR: This is the Queue-based Assigned Rate in UE, the lowest rate in the TFC subset available for UE which can empty the buffer within one TTI.

$$QbR = Ceil(Q/TTI)$$

The Ceil(Q/TTI) function returns the closest higher rate in the TFC subset to the (Q/TTI). If Q is in kbits and TTI in milliseconds, therefore the rate would be in bps.

CbR: This is the Cell-based Assigned Rate in UE. It will be used only if the cell is congested; that means when CI is more than 1. After receiving CI from Node-B, UE calculates the CbR using previous assigned rate Rk as follows:

$$CbR = Map(TFCS, CI, Rk)$$

The Map(TFCS, CI, Rk) function returns a rate considering current rate and CI value. Let's assume TFC Subset has 7 different rates; TFCS [7]={8, 16, 32, 64, 128, 256, 384} and Rk=TFCS [i] then:

$$Map(TFCS, CI, Rk) = TFCS\,[\max(i-(10-\mathrm{floor}(CI*10)), 0)]$$

CB_Threshold: The rate control parameter which defines whether or not the UE is in critical situation. CB_Threshold is a service-dependant parameter therefore would be same for same group of users. This threshold can be controlled by Node B, for example using system broadcast messages.

CI_Threshold: The congestion control parameter which defines whether or not the Cell capacity is in critical situation. This threshold could be implicitly or explicitly signalled from Node B. For implicit signalling the CI would be normalised to its critical cell capacity value, thus CI<1 would represent under utilisation of uplink capacity and CI>1 would represent over loading condition.

(2) Initialization:

In the beginning, UE will choose the lowest rate which can empty the buffer next TTI. This is called Queue-based Rate (QbR). Also CB_Threshold and CI_Threshold should be initialised. Just as an example, we assume CB_Threshold=50% and CI_Threshold=1 for the time being.

(3) Scheduling Algorithm:

(3.1) At TTI number k+1, for nth UE:

I) If CI<CI_Threshold, which means the cell has available capacity and it is not congested, then:

a) If (QbR<R(k)), which means the rate chosen by Queue is less than or equal to previous rate $R(k+1)=QbR$ b) Else, which means the UE is demanding for higher rate i) If (CB>CB_Threshold), which means the UE is probably in critical situation $R(k+1)=QbR$ ii) Else, $R(k+1)=R(k)$ II) Else CI≧CI_Threshold, which means the cell is congested a) If (QbR<R(k)), which means the rate chosen by Queue is less than or equal to previous rate $R(k+1)=\min(QbR, CbR)$ b) Else, which means the UE is demanding for higher rate i) If CB>CB_Threshold), which means the UE is probably in critical situation $R(k+1)=R(k)$ ii) Else, $R(k+1)=CbR$ (3.2) UE checks the R(k+1) in terms of its available transmit power. If it dose not have enough power head room, it will choose the maximum available rate.

(3.3) Under any circumstances, if UE has data and available power, it can autonomously transmit at the TFC in minimum set, equal to $R_{minTFC}$=8 kbps.

Figure 5:
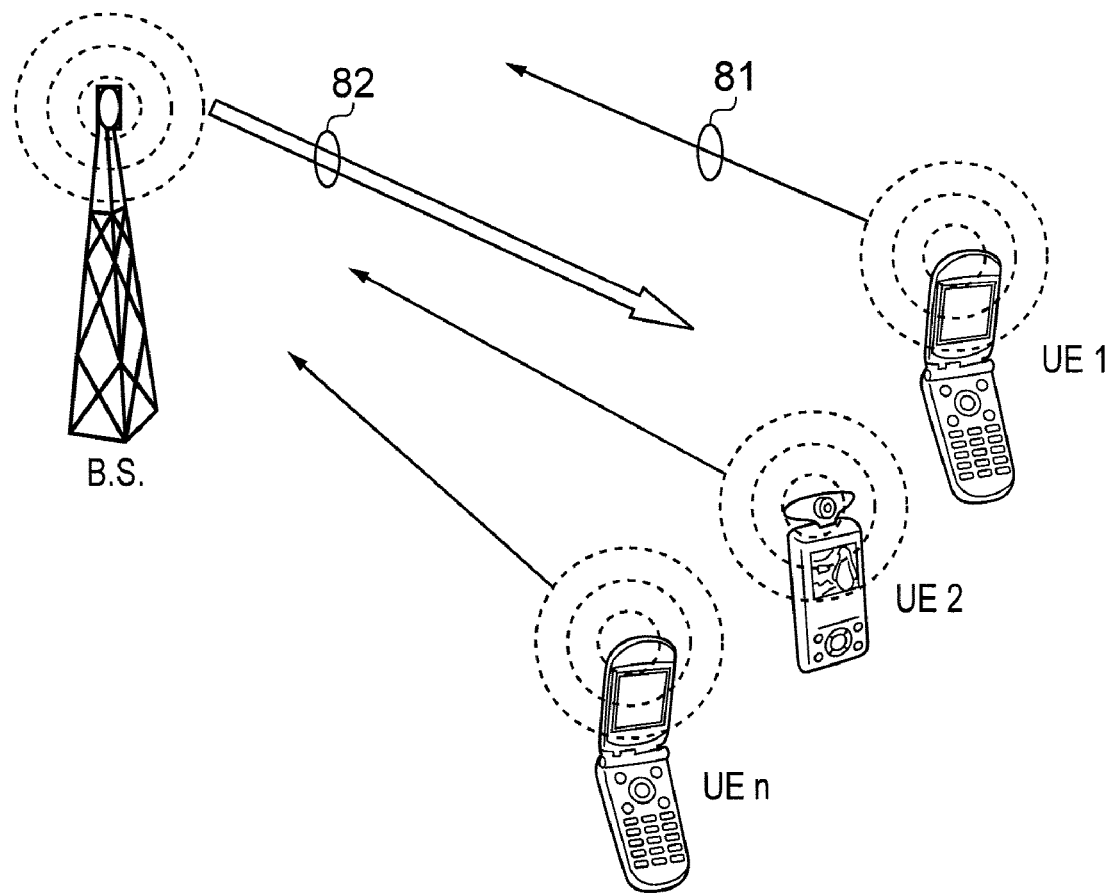
FIG. 5 shows an example of the operation of an embodiment of the present invention.

FIG. 5 illustrates an example of the operation of an embodiment of the present invention and shows a plurality of user equipments UE1, UE2 to UEn transmitting information representing the status of the UE to a base station BS over a plurality of traffic and control channels 81. The base station determines a second indicator from the status information received from all of the UEs and broadcasts this second indicator over a common control channel 82, to all user equipments. This may then be used by each of the user equipments in the determination of a relative indicator specific to each UE for use in making scheduling decisions.

Second Algorithm

This algorithm requires only downlink common broadcast channel signalling. This algorithm requires minimum of 2 metrics:

I. NQ: normalized UE's queue size available at UE.

II. CI: Capacity Indicator at Node-B which can be defined as RoT/NRT. NRT is the Noise Rise Target and RoT is the Rise over Thermal noise averaged every TTI.

NOTE: CI is signalled to UE over a cell wide broadcast channel since it is same for all UEs in the cell. NQ is known by UE.

(1) Term definitions: as for algorithm 1.

(2) Initialisation:

In the beginning, UE will choose the lowest rate which can empty the buffer next TTI. This is called Queue-based Rate (QbR). Also NQ_Threshold and CI_Threshold should be initialised. Just as an example, we assume NQ_Threshold=50% and CI_Threshold=1 for the time being.

(3) Scheduling Algorithm:

(3.1) At TTI number k+1, for nth UE:

I) If CI<CI_Threshold, which means the cell has available capacity and it is not congested, then:

a) If (QbR<R(k)), which means the rate chosen by Queue is less than or equal to previous rate $R(k+1)=QbR$ b) Else, which means the UE is demanding for higher rate i) If (NQ>NQ_Threshold), which means the UE is probably in critical situation $R(k+1)=QbR$ ii) Else $R(k+1)=R(k)$ II) Else CI≧CI_Threshold, which means the cell is congested a) If (QbR<R(k)), which means the rate chosen by Queue is less than or equal to previous rate:

$R(k+1)=\min(QbR, CbR)$ b) Else, which means the UE is demanding for higher rate:

i) If (NQ>NQ_Threshold), which means the UE is probably in critical situation $R(k+1)=R(k)$ ii) Else $R(k+1)=CbR$ 2. UE checks the R(k+1) in terms of its available transmit power. If it dose not have enough power head room, it will choose the maximum available rate.

3. Under any circumstances, if UE has data and available power, it can autonomously transmit at the TFC in minimum set, equal to $R_{minTFC}$=8 kbps.

The invention claimed is:

1. A method of obtaining a relative indicator for use in scheduling uplink transmissions from a plurality of user equipments to a base station, the relative indicator indicating a status of a user equipment relative to a status of the other user equipments, the method comprising the steps of:

i) determining, for each user equipment, a first indicator which is indicative of a status of that user equipment;

ii) determining one or more second indicators from the first indicators for the user equipments obtained in step i), wherein at least one said second indicator relates to buffer status of the user equipments;

iii) broadcasting one, or each of said second indicators which relates relate to buffer status of the user equipments; and iv) determining, for a given user equipment, a relative indicator from the first indicator obtained for that user equipment and from one of the second indicators determined in step ii) or a second indicator determined previously.

2. A method as claimed in claim 1, wherein the relative indicator determined for a given user equipment is the difference between the first indicator obtained for that user equipment and a second indicator.

3. A method as claimed in claim 1, wherein the relative indicator determined for a given user equipment is the ratio of the first indicator and a second indicator.

4. A method as claimed in claim 1, wherein the relative indicator determined for a given user equipment is determined from the first indicator obtained for that user equipment and a second indicator, and wherein the second indicator is determined from the first indicators obtained for all user equipments at the same time as the first indicator was obtained.

5. A method as claimed in claim 1, wherein the relative indicator for a given user equipment is determined from the first indicator obtained for that user equipment and a second indicator, wherein the second indicator is determined from the first indicators obtained for all user equipments at a previous instant in time to the instant in time that the first indicator was obtained.

6. A method as claimed in claim 1, wherein the first indicator is indicative of how full a data buffer associated with each user equipment is.

7. A method as claimed in claim 1, wherein the first indicator is indicative of the transmit power available to each user equipment.

8. A method according to claim 1, wherein the first indicator is an indicative of the total amount of data to be sent by each user equipment.

9. A method as claimed in claim 1, wherein the first indicator is indicative of the transmission delay experienced by the data waiting to be sent by each user equipment.

10. A method according to claim 1, wherein the first indicator is an indicative of the total amount of data to be sent by each user equipment.

11. A method according to claim 10, further comprising the step of determining the amount of data in the user equipment's data buffer based on the indication of the total amount of data, and an amount of data already received by the base station from that user equipment.

12. A method as claimed in claim 6, further comprising the step of determining an indication of the mean transmission delay experienced by each user equipment.

13. A method as claimed in claim 12, further comprising the step of determining the average mean transmission delay for all user equipments and/or the minimum mean transmission delay for all user equipments.

14. A method as claimed in claim 13, further comprising the step of broadcasting the average mean transmission delay and/or the minimum mean transmission delay to all of the user equipments.

15. A method as claimed in claim 14, further comprising the step of determining, for a given user equipment, at least one further relative indicator from the mean transmission delay experienced by the given user equipment and i) the average mean transmission delay for all user equipments and/or ii) the minimum mean transmission delay for all user equipments.

16. A method as claimed in claim 1, further comprising the step of determining an indication of the rise of wideband received power over thermal noise experienced in the reception of uplink signals by the base station.

17. A method as claimed in claim 16, further comprising the step of determining the ratio of the rise of wideband received power over thermal noise to a noise rise target for the uplink.

18. A method as claimed in claim 17, further comprising the step of broadcasting the ratio of the rise of wideband received power over thermal noise to a noise rise target, to all user equipments.

19. A method as claimed in claim 1, wherein at least one of the second indicator(s) is the average of the first indicators obtained for all user equipments.

20. A method as claimed in claim 1, wherein at least one of the second indicator(s) is the minimum of the first indicators obtained for all user equipments.

21. A method according to claim 1, further comprising the step of scheduling uplink transmissions in dependence on the or each relative indicator.

22. A method according to claim 17, further comprising the step of scheduling uplink transmissions in dependence on the or each relative indicator and the step of scheduling uplink transmissions in further dependence on the ratio of the rise of wideband received power over thermal noise to a noise rise target.

23. A method according to claim 21, wherein uplink transmissions are scheduled using rate scheduling or time scheduling.

24. A method according to claim 22, wherein uplink transmissions are scheduled using hybrid rate-time scheduling.

25. A method according to claim 21, wherein the rate of uplink transmission is varied by adjusting the modulation and coding scheme level.

26. A method according to claim 21, wherein the rate of uplink transmission is varied by adjusting the intervals at which the uplink transmissions take place.

27. A user equipment comprising:
i) a transmitter for transmitting to a base station a first indicator which is indicative of a status of the user equipment;
ii) a receiver for receiving, from a base station via a broadcast channel, at least one second indicator which relates to buffer status of user equipments, wherein one of the second indicators has been determined from either a) the first indicator and another first indicator which is indicative of a status of at least one other user equipment at the same time, or b) from a first indicator which is indicative of the status of the user equipment at a previous time and a first indicator which is indicative of a status of at least one other user equipment at the previous time; and
iii) a unit to determine a relative indicator from the first indicator and one of the second indicators.

28. A user equipment as claimed in claim 27, further comprising a means to determine the first indicator which is indicative of a status of the user equipment.

29. A user equipment as claimed in claim 27, wherein the means to determine the first indicator comprises a means to determine a difference between the first indicator and a second indicator.

30. A user equipment as claimed in claim 27, wherein the means to determine the first indicator comprises a means to determine a ration of the first indicator and a second indicator.

31. A user equipment as claimed in claim 27, further comprising a means to schedule uplink transmission in dependence on the relative indicator.

32. A user equipment as claimed in claim 31, wherein the scheduling means is arranged to determine a rate and/or time at which data is to be transmitted to the base station based on the relative indicator.

33. A user equipment according to claim 32, wherein the scheduling means is arranged such that data is transmitted to the base station at a higher rate than would otherwise be the case when the user equipment receives a relative indicator indicating that it has a relatively full buffer.

34. A user equipment according to claim 32, wherein the scheduling means is arranged such that data is transmitted to the base station at a lower rate than would otherwise be the case when the user equipment receives a relative indicator indicating that it has a relatively empty buffer.

35. A user equipment according to claim 31, further comprising means for determining a measurement of radio channel conditions, wherein the scheduling means is arranged to determine the time and/or rate at which data is transmitted based additionally on a measurement of radio channel conditions.

36. A user equipment according to claim 31, wherein the scheduling means is arranged to determine the time and/or rate of data transmission based additionally on the type of service.

37. A user equipment according to claim 31, wherein the scheduling means is arranged to determine the time and/or rate of data transmission based additionally on the or a amount of data which is determined to be in its data buffer and/or transmission delay experienced by the data waiting in the buffer.

38. A user equipment according to claim 31, wherein the scheduling means is arranged such that data is transmitted even when the amount of data in the data buffer is below a minimum buffer threshold, when the user equipment receives a relative indicator indicating that it has more data to transmit than other user equipments.

39. A base station comprising:
i) a receiver to receive, from each of a plurality of user equipments, a first indicator, which is indicative of a status of that user equipment;
ii) means to determine, from the first indicators obtained for the user equipments, one or more second indicators which related to buffer status of the user equipments; and
iii) a transmitter to broadcast, to the user equipments via a broadcast channel, one, or each of said second indicators which relate to buffer status of the user equipments, which the user equipments are adapted to use, together with their respective first indicators, to determine relative indicators for scheduling transmissions to the base station.

40. A base station as claimed in claim 39, wherein the means to determine a second indicator determines an indication of the average and/or minimum of the first indicators received from all of the user equipments.

41. A base station as claimed in claim 39, wherein the first indicators received from the user equipments are indicative of how full a data buffer associated with each user equipment is and/or an indication of the transmission delay experienced by the data waiting in the buffer.

42. A base station as claimed in claim 41, further comprising a means to determine a indication of the mean transmission delay for each user equipment.

43. A base station as claimed in claim 42, further comprising a means to determine the average mean transmission delay for all user equipments and/or the minimum mean transmission delay for all user equipments.

44. A base station as claimed in claim 43, further comprising a means to broadcast the average mean transmission delay and/or the minimum mean transmission delay to all of the user equipments.

45. A base station as claimed in claim 39, further comprising a means to determine an indication of the rise of wideband received power over thermal noise experienced in the reception of uplink signals by the base station.

46. A base station as claimed in claim 45, further comprising means to determine the ratio of the rise of wideband received power over thermal noise to a noise rise target for the uplink.

47. A base station as claimed in claim 46, further comprising means to broadcast the ratio of the rise of wideband received power over thermal noise to a noise rise target, to all user equipments.

48. A base station as claimed in claim 39, wherein the base station comprises means for receiving from a user equipment an indication of the amount of data that that user equipment has in its data buffer.

49. A base station according to claim 39, wherein the base station further comprises: means for receiving from a user equipment an indication of a total amount of data to be sent by that user equipment; and means for determining the amount of data in the user equipment's data buffer based on the indication of the total amount of data, and the amount of data already received by the base station from that user equipment.

* * * * *